United States Patent [19]

Schlegel et al.

[11] Patent Number: 4,573,542
[45] Date of Patent: Mar. 4, 1986

[54] LOAD-WEIGHING APPARATUS FOR AN ELEVATOR CAR

[75] Inventors: Urs Schlegel, Emmenbrücke; Ljudevit Tomse, Dierikon; Urs Wenger, Lucerne, all of Switzerland

[73] Assignee: Inventio AG, Hergiswil, Switzerland

[21] Appl. No.: 698,131

[22] Filed: Feb. 4, 1985

[30] Foreign Application Priority Data

Feb. 14, 1984 [CH] Switzerland ............... 707/84

[51] Int. Cl.⁴ .................. G01G 19/52; G01G 3/14; G01L 1/22
[52] U.S. Cl. ................... 177/132; 177/211; 73/862.67
[58] Field of Search ............ 177/132, 147, 164, 211; 73/862.67

[56] References Cited

U.S. PATENT DOCUMENTS

| | | | |
|---|---|---|---|
| 3,077,236 | 2/1963 | Green et al. | 177/211 X |
| 3,221,829 | 12/1965 | Kohler | 177/211 X |
| 3,437,160 | 4/1969 | Hill | 177/211 |
| 3,512,595 | 5/1970 | Laimins . | |
| 3,561,554 | 2/1971 | Merriam et al. | 177/211 X |
| 3,788,410 | 1/1974 | Allenspach et al. | 177/211 X |
| 4,078,623 | 3/1978 | Ohta et al. . | |
| 4,223,752 | 9/1980 | Belcher . | |
| 4,307,787 | 12/1981 | Raboud et al. | 177/211 X |
| 4,375,243 | 3/1983 | Doll | 177/211 X |

FOREIGN PATENT DOCUMENTS

| | | |
|---|---|---|
| 0030134 | 6/1981 | European Pat. Off. . |
| 1136467 | 9/1962 | Fed. Rep. of Germany . |
| 467348 | 7/1937 | United Kingdom . |
| 1159524 | 7/1969 | United Kingdom . |
| 1281641 | 7/1972 | United Kingdom . |

Primary Examiner—George H. Miller, Jr.
Attorney, Agent, or Firm—Werner W. Kleeman

[57] ABSTRACT

The load-weighing apparatus faultlessly detects even smallest load variations in the lower load range. For this purpose wire strain gauges are mounted at structural parts or components of the elevator car and these structural parts or components are subjected to bending under the load to be weighed. The wire strain gauges are interconnected to form a bridge circuit. An amplifier circuit is connected at the output side of the bridge circuit and has a higher gain in the lower load range. When an input voltage corresponding to a predetermined load occurs at the amplifier circuit, the gain of the amplifier circuit is switched to a lower value. It is thus possible to detect loads throughout a greater range of loads.

9 Claims, 4 Drawing Figures

2

4,573,542

LOAD-WEIGHING APPARATUS FOR AN ELEVATOR CAR

BACKGROUND OF THE INVENTION

The present invention relates to a new and improved construction of a load-weighing apparatus for an elevator car.

In its more particular aspects, the present invention relates specifically to a new and improved construction of a load-weighing apparatus for an elevator car and containing wire strain gauges which are interconnected to form a bridge circuit. There is also provided an amplifier circuit, the input side of which is connected to the output side of the bridge circuit. The output side of the amplifier circuit is connected to an elevator control.

Load-weighing apparatus in elevators serve the purpose of generating load-proportional signals which are required for the elevator control. In simpler designs of elevator systems it is generally sufficient to generate signals which indicate the conditions "occupied", "full load", and "overload". Beyond that and for more refined controls there are required load signals which are generated in finer steps or continuously.

This requirement can be met by using the apparatus as known, for example, from Swiss Pat. No. 425,134. Therein the elevator car platform is supported at an elevator car platform frame of the elevator car by means of springs, the deflection of which is evaluated such that load-proportional signals are generated. There is suggested, among other things, for the evaluation of the spring deflection that a measuring point is formed by means of a lever system, and that this measuring point is located at the center of the elevator car platform. The deflection travel of the measuring point is proportional to a mean deflection of all the springs. The displaceable measuring point or location can be connected, for example, to a plunger-type armature of a plunger-type coil or to a wire strain gauge, so that a continuous generation of load-proportional signals is possible. Such apparatus is relatively complicated and expensive. Furthermore, due to the inertia and insensitivity of such apparatus in the lower load range there is hardly possible a faultless signaling of small load variations.

In a text book entitled "Elektronik", second part, published by Europa-Lehrmittel, Wuppertal, 4th edition, 1978, pages 14 and 15, there is described a load-weighing apparatus of the type as initially described and in which the wire strain gauges are incorporated into a load cell. Such load cells are commercially available and are relatively expensive and therefore unsuited for use with cost-favorable elevators. Furthermore, also with this apparatus there is not readily obtained a faultless detection of small load variations in the lower range of loads.

SUMMARY OF THE INVENTION

Therefore, with the foregoing in mind it is a primary object of the present invention to provide a new and improved construction of load-weighing apparatus for an elevator car, which apparatus is not afflicted with the aforementioned drawbacks and limitations of the prior art constructions heretofore discussed.

Another and more specific object of the present invention is directed to the provision of a new and improved construction of load-weighing apparatus for an elevator car which particularly enables the detection of load variations in the lower range of loads with the required precision.

A further significant object of the present invention is directed to the provision of a new and improved load-weighing apparatus for an elevator car and which, while enabling the detection of load changes in the lower range of loads, also covers a largest possible total range of loads.

Now in order to implement these and still further objects of the invention, which will become more readily apparent as the description proceeds, the apparatus of the present development is manifested by the features that, the wire strain gauges are mounted immediately at structural parts or components of the elevator car which are subjected to the load to be measured. The amplifier circuit has a higher gain at low loads than at higher loads, and the output or output side of the amplifier circuit is designed as a voltage-controlled current source.

The advantages achieved by the invention essentially are a result of the simple arrangement of the wire strain gauges between the elevator car platform and the elevator car platform frame, so that the wire strain gauges are protected from mechanical damage and humidity. Also the use of load cells can be dispensed with. The steeper output characteristic of the amplifier of the amplifier circuit in the lower load range permits detecting even smallest load variations in this range. The smaller gain at higher loads results in the favorable effect that at a predetermined output control range of the amplifier circuit a larger range of loads can be covered. Due to the fact that the output or output side of the amplifier circuit is designed as a voltage-controlled current source there is achieved the beneficial result that the measured load values are transmitted to the elevator control in a substantially unaffected manner.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
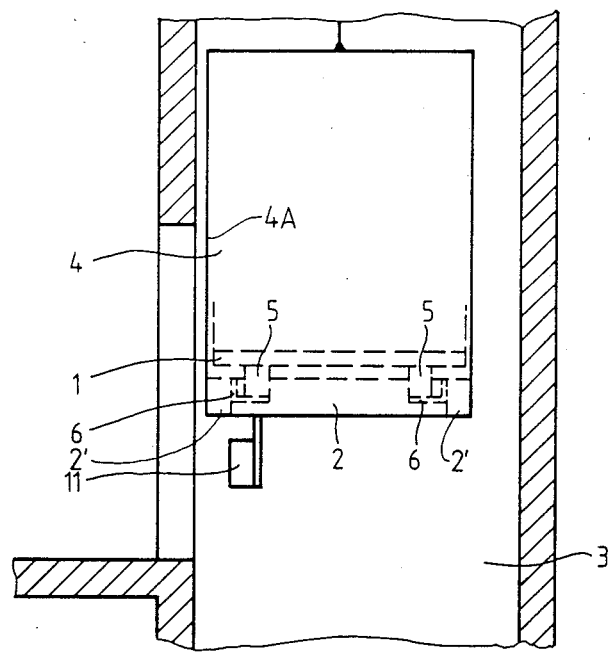
FIG. 1 is a schematic, partially cross-sectional view of an elevator hoistway and and elevator car guided therein and provided with an exemplary embodiment of the load-weighing apparatus according to the invention.
Figure 2:
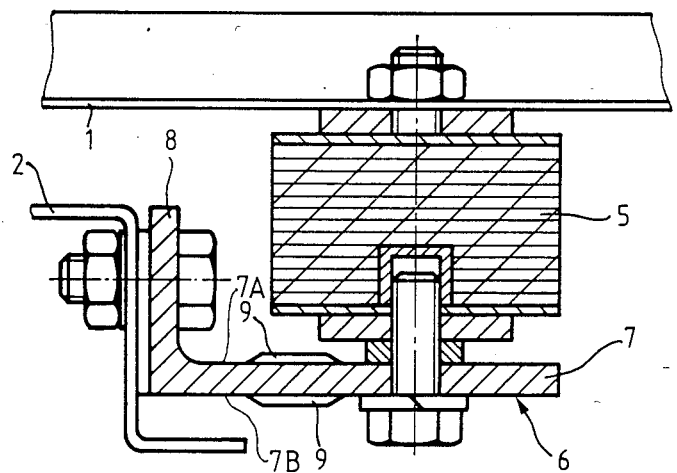
FIG. 2 is a detailed, partially cross-sectional view, on an enlarged scale, of the exemplary embodiment of the load-weighing apparatus shown in FIG. 1.

Describing now the drawings, it is to be understood that only enough of the construction of the load-weighing apparatus has been shown as needed for those skilled in the art to readily understand the underlying principles and concepts of the present development, while simplifying the showing of the drawings. Turning attention now specifically to FIG. 1, there is shown therein an elevator hoistway 3 in which an elevator car 4 is displacably guided. An elevator car platform is designated by the reference numeral 1 and an elevator car platform frame is designated by the reference numeral 2. The elevator car platform 1 is supported via insulating elements 5 at horizontal extending legs 7 of a predetermined number of angles or angle members 6. Each one of the angle members 6 has a vertically extending leg 8 which is fastened to the elevator car platform frame 2 by means of bolts or any other appropriate fastening means. Preferably four angles or angle members 6 are provided which are arranged in the four corner regions 2' of the elevator car platform frame 2. Only two of such corner regions 2' are visible in the illustration of FIG. 1.

Each one of the angles or angle members 6 defines a top side or surface 7A and a bottom side or surface 7B. At each one of the horizontally extending legs 7 of the angle members 6 a wire strain gauge 9 is mounted at the top side or surface 7A and a further wire strain gauge 9 is mounted at the bottom side or surface 7B. The wire strain gauges 9 at the four angle members 6 are connected in such a manner that there is formed a bridge circuit 10 comprising four junctions A, B, C, D. As illustrated in the schematic block circuit diagram shown in FIG. 3 of the drawings, this bridge circuit 10 is connected at its output side to the input side of an amplifier circuit 11. The amplifier circuit 11 is secured at the elevator car platform frame 2 below the elevator car 4 on a door side 4A thereof. Due to this arrangement the amplifier circuit 11 is readily accessible for mounting and adjusting purposes from a floor or landing in a corresponding position of the elevator car 4.

Figure 3:
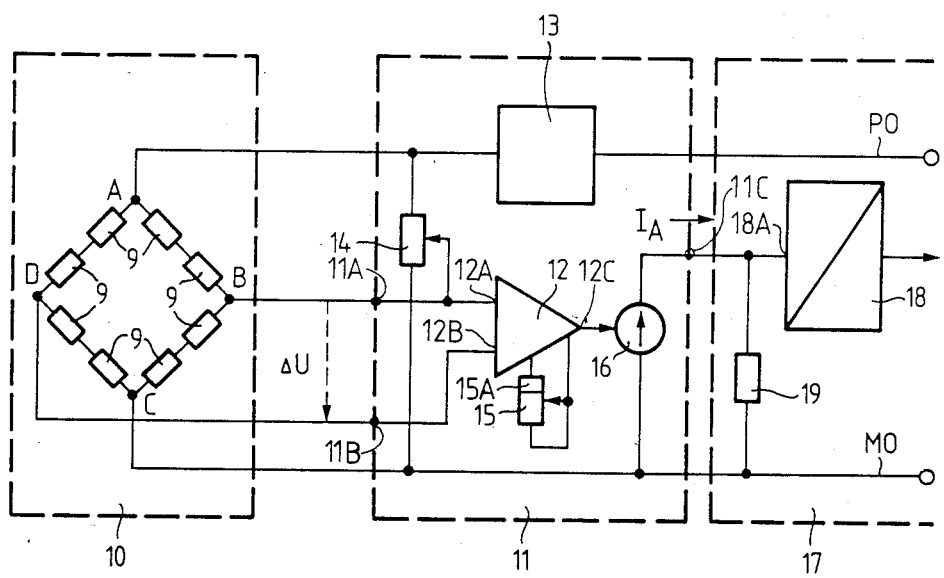
FIG. 3 is a block circuit diagram of the electrical components in the load-weighing apparatus shown in FIG. 2.

As shown in FIG. 3 the amplifier circuit 11 possesses two inputs 11A and 11B which are respectively connected to the inputs 12A and 12B of an operational amplifier 12 which is incorporated in the amplifier circuit 11. The inputs 11A and 11B are connected to the junctions B and D defining the null branch of the bridge circuit 10. This bridge circuit 10 is supplied by a not particularly illustrated voltage source of conventional construction by means of a conductor or line PO and a further conductor or line MO. A stabilization circuit 13 is connected in the conductor PO. The bridge circuit 10 is balanced by means of a voltage divider 14 which is also connected to the aforementioned voltage source, i.e. to the two conductors MO and PO.

A suitable switching element symbolized by reference numeral 15 controls the gain of the operational amplifier 12 as a function of the input voltage appearing at the inputs 12A and 12B of the operational amplifier 12. Specifically, a trigger circuit 15A of the switching element 15 adjusts the gain of the amplifier circuit 11 in at least one step at least at one preselected input voltage received by the amplifier circuit 11 as a function of the load of the elevator car 4. For example, the gain of the operational amplifier 12 is switched to a lower value when the preselected input voltage $\Delta U$ assumes a value which corresponds to a load of 50 kilograms. The operational amplifier 12 is connected at its output side 12C with a voltage-controlled current source which is of conventional construction and which is symbolized by reference numeral 16. Consequently, there appears at the output or output side 11C of the amplifier circuit 11 an impressed output current $I_A$ which is only dependent upon the output voltage of the operational amplifier 12. An elevator control which is realized, for example, by a digital computer, is designated by reference numeral 17. The output 11C of the amplifier circuit 11 is connected to an input 18A of an analog-to-digital converter 18 of the elevator control 17 and the input voltage of the analog-to-digital converter 18 is tapped via a resistor 19 connected between the input 18A of the analog-to-digital converter 18 and the conductor or line MO.

Figure 4:
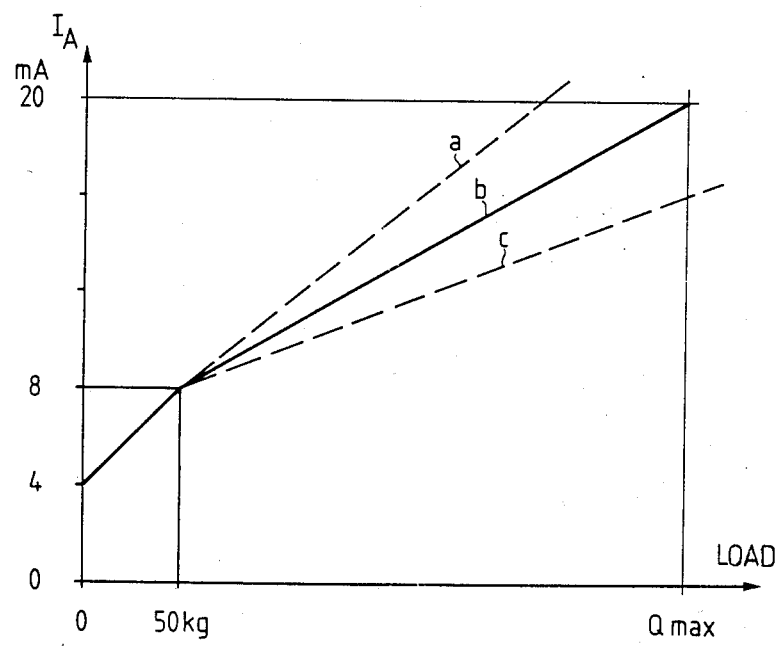
FIG. 4 shows the output characteristic of the amplifier circuit used in the load-weighing apparatus illustrated by FIG. 2 and depicts the output current of the amplifier circuit as a function of the elevator car load.

When the elevator car platform 1 is loaded, the wire strain gauges 9 which are present on the top side or surface 7A of the horizontal legs 7 of the angle members 6 are elongated and the wire strain gauges 9 which are present on the bottom side or surface 7B of the horizontal legs 7 of the angle members 6 are compressed. A resistance change is effected thereby, so that the bridge circuit 10, which was in a balanced condition until such time, becomes unbalanced, so that the voltage difference $\Delta U$ which is proportional to the load appears at the inputs 11A and 11B of the amplifier circuit 11 and the impressed output current $I_A$, see FIG. 3, appears at the output or output side 11C of the amplifier circuit 11. This impressed output current $I_A$ is proportional to the voltage difference $\Delta U$. As shown in FIG. 4, the output characteristic of the amplifier circuit 11 has a steeper slope up to a load of, for example, 50 kilograms, so that small load variations can be faultlessly detected. In the range of greater loads the output characteristic of the amplifier circuit 11 has a smaller slope. As indicated in FIG. 4, output characteristics a, b, or c of different slopes can be realized depending on the rated load $Q_{max}$ and upon the output control range of the amplifier circuit 11.

While there are shown and described present preferred embodiments of the invention, it is to be distinctly understood that the invention is not limited thereto, but may be otherwise variously embodied and practiced within the scope of the following claims. Accordingly,

What we claim is:

1. A load-weighing apparatus for an elevator car, comprising:
   a predetermined number of wire stain gauges;
   a predetermined number of load-subjected components provided at said elevator car and subjected to the a load to be weighed;
   said predetermined number of wire strain gauges being directly mounted at said elevator car at said load-subjected components;
   a bridge circuit having an output side and formed by said predetermined number of wire strain gauges;
   an amplifier circuit having an input side and an output side;
   said input side of said amplifier circuit being connected to said output side of said bridge circuit;
   said amplifier circuit including means for imparting a higher gain to the amplifier circuit in the presence of small loads than in the presence of high loads of the elevator car;
   said amplifier circuit including a voltage-controlled current source at said output side of said amplifier circuit; and
   an elevator control connected to said output side of said amplifier circuit.

2. The load-weighing apparatus as defined in claim 1, wherein:
   said load-subjected components at which said predetermined number of wire strain gauges are directly mounted, constitute components which are subjected to bending under the load to be weighed.

3. The load-weighing apparatus as defined in claim 2, further including:
   a predetermined number of angle members constituting said bending-subjected components;
   said elevator car comprising an elevator car platform frame;
   each one of said predetermined number of angle members comprises a vertical leg mounted at said elevator car platform frame;
   said elevator car comprising an elevator car platform;
   a predetermined number of insulating elements;
   each one of said predetermined number of angle members comprising a horizontal leg;
   said elevator car platform being supported at said horizontal legs of said predetermined number of angle members by means of said predetermined number of insulating elements;
   each one of said horizontal legs defining a top side and a bottom side;
   one of said predetermined number of wire strain guages being mounted at the top side of each one of said horizontal legs; and
   a further one of said predetermined number of wire strain gauges being mounted at the bottom side of each one of said horizontal legs.

4. The load-weighing apparatus as defined in claim 3, wherein:
   said elevator car platform frame comprises four corner regions;
   said predetermined number of angle members constituting four angle members each one of which is mounted at a related one of said four corner regions of said elevator car platform frame;
   said bridge circuit comprising four junctions; and
   said wire strain gauges mounted at each one of said four angle members being associated with a related one of the four junctions of said bridge circuit.

5. The load-weighing apparatus as defined in claim 1, wherein:
   said elevator car comprises four corner regions;
   each one of said load-subjected components being mounted at one of the four corner regions of said elevator car;
   said bridge circuit comprising four junctions;
   at least one of said predetermined number of wire strain gauges being arranged at each one of said load-subjected components mounted at said four corner regions of the elevator car; and
   said at least one of said predetermined number of wire strain gauges being connected to a related one of said four junctions of said bridge circuit.

6. The load-weighing apparatus as defined in claim 1, wherein:
   said higher-gain imparting means comprises a switching element contained in said amplifier circuit;
   said input side of said amplifier circuit receiving an input voltage depending upon the load of the elevator car; and
   said switching element adjusting the gain of said amplifier circuit as a function of said input voltage received at the input side of said amplifier circuit.

7. The load-weighing apparatus as defined in claim 6, wherein:
   said switching element comprises a trigger circuit for adjusting the gain of said amplifier circuit in at least one step at least at one preselected input voltage received by said amplifier circuit and corresponding to at least one preselected load of said elevator car.

8. The load-weighing apparatus as defined in claim 7, wherein:
   said at least one preselected input voltage corresponds to a preselected load of at least about 50 kilograms.

9. The load-weighing apparatus as defined in claim 1, wherein:
   said elevator car defines a door side of said elevator car; and
   said amplifier circuit being mounted below the elevator car at the region of the door side of said elevator car.

* * * * *

UNITED STATES PATENT AND TRADEMARK OFFICE
CERTIFICATE OF CORRECTION

PATENT NO. : 4,573,542

DATED : March 4, 1986

INVENTOR(S) : URS SCHLEGEL et al.

It is certified that error appears in the above—identified patent and that said Letters Patent is hereby corrected as shown below:

Column 2, line 49, please delete "and" (second occurrence) and insert --an--

Column 4, line 43, please delete "stain" and insert --strain--

Column 4, line 46, please delete "the"

Signed and Sealed this

First Day of July 1986

[SEAL]

Attest:

DONALD J. QUIGG

Attesting Officer

Commissioner of Patents and Trademarks